United States Patent

[11] 3,549,908

[72] Inventor Robert C. Houlne
McLean, Va.
[21] Appl. No. 775,796
[22] Filed Nov. 14, 1968
[45] Patented Dec. 22, 1970
[73] Assignee the United States of America as represented by the Secretary of the Navy. by mesne assignments

[54] TURN-OFF CIRCUIT FOR DC LOAD CARRYING SCR SWITCH
5 Claims, 1 Drawing Fig.

[52] U.S. Cl. .......... 307/252, 307/314; 315/340; 323/50
[51] Int. Cl. .......... H03k 17/00
[50] Field of Search .......... 315/340; 307/282, 314, 252, 252C; 323/50, 84, 85, 86, 87

[56] References Cited
UNITED STATES PATENTS
3,348,123 10/1967 Morgan .......... 323/50X

*Primary Examiner*—Donald D. Forrer
*Assistant Examiner*—B. P. Davis
*Attorney*—Joseph C. Warfield and John W. Pease

ABSTRACT: In a DC circuit in which positive load voltage is applied to the anode of an SCR load current switch, improved turnoff circuit means incorporating two transformers having their primary windings connected in series with the SCR switch and with the secondaries of the transformers connected in series and being short circuited, the polarities of the windings of the transformers being connected such that the inductive impedance to a voltage across the primaries in series is zero, together with a DC pulse-producing means connected to a control point intermediate said primary windings to provide, when said pulse means is actuated, a back bias pulse to force the load current SCR switch to commute to OFF condition, without interrupting the supply of positive DC current to the SCR switch and without introducing an undesirably high impedance value in the DC load circuit.

PATENTED DEC 22 1970 3,549,908
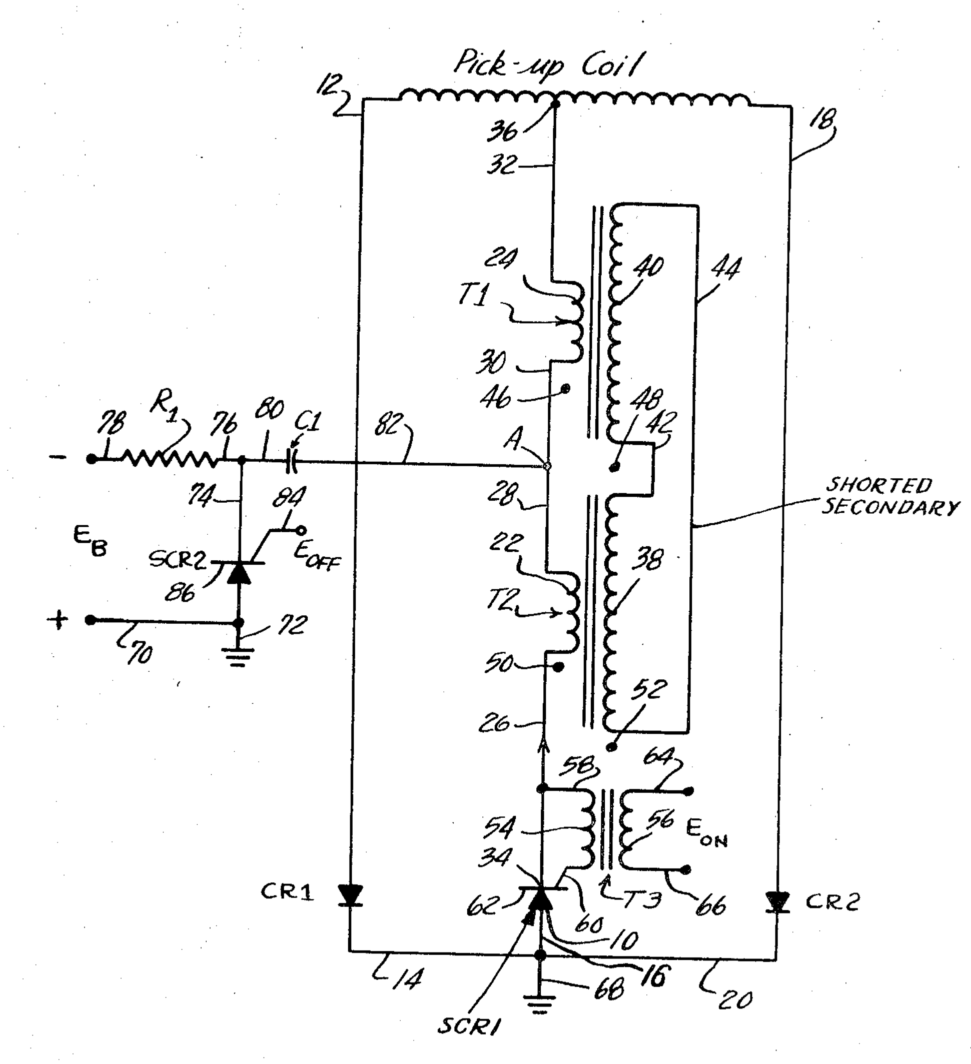
ROBERT C. HOULNE
INVENTOR.
BY John M. Pease
Attorney

TURN-OFF CIRCUIT FOR DC LOAD CARRYING SCR SWITCH

BACKGROUND OF THE INVENTION

This invention is particularly useful in application to VLF (very low frequency) SCR switches. It can also be usefully applied to any DC circuit in which a positive voltage is continuously applied to the anode of an SCR.

One of the difficult problems with high power VLF switches utilizing SCR's is cooling. Because of the package configuration of solid-state devices, isolation from ground and each other is required in the normal switch circuit.

Since an SCR having positive voltage applied to its anode is continually forward biased, it is not possible to turn the SCR off without removing the DC voltage source or applying a blocking voltage to the cathode of the SCR. In many cases, as for example in the case of an SCR used as switch means in an antenna turner, it is not practical to remove the DC source. In such case it is also not practical to apply a blocking voltage to the cathode of the SCR as such voltage would be shorted to ground through the pickup coil and diodes of the circuit. An impedance must be inserted in series with the SCR and the blocking voltage. However, any impedance placed in series with the SCR will reduce the effectiveness of the SCR as a short circuit.

SUMMARY OF THE INVENTION

In accordance with the subject invention the need for removal of the DC applied voltage or the insertion of an impedance in series with the SCR and blocking voltage is avoided by utilizing two transformers with their primaries connected in series with the SCR and their secondaries connected in series and shorted, together with pulse generation means for applying a blocking pulse voltage at the point between the two transformer primaries. The polarities of the transformer windings are selected such that the inductive impedance to a voltage applied across the primaries in series is zero. The impedance presented to a voltage applied at the control point between the transformer primaries is the leakage reactance of the two primaries connected in parallel. BRIEF DESCRIPTION OF THE DRAWING In the drawing the single FIG. shows diagrammatically the application of the subject invention to an SCR receiving a full wave rectified current from a pickup coil. DESCRIPTION OF THE PREFERRED EMBODIMENT Referring to the drawing, there is shown an SCR1 connected to receive full wave rectified current at its anode indicated at 10 from a pickup coil (indicated via line 12, diode CR1, line 14, and line 16 for one-half cycle and via line 18, diode CR2, line 20 line 16 on the other half cycle.

In accordance with the invention a pair of transformers, indicated generally at T1 and T2, are connected with the their primaries 22 and 24 connected in series via lines 26, 28,30, and 32 between the cathode 34 of SCR1 and midtap 36 of the pickup coil indicated. The secondary windings 38 and 40 of the transformers T1 and T2 are connected in series by a line 42 and shorted by a line 44. The polarities of the windings are selected, as indicated by the dots 46, 48, 50, and 52, such that the impedance to a voltage applied across the primaries in series is zero and the impedance presented to a voltage applied at a control point A between the two transformers is the leakage reactance of the two primaries connected in parallel.

To condition the SCR1 to ON condition, I provide a transformer T3 having its secondary 54 connected via lines 58 and 60 respectively to the cathode 34 and gate 62 of SCR1 and having its primary 56 connected via lines 64 and 66 to a positive pulse source indicated as $E_{ON}$. The anode of SCR1 is connected by line 68 to ground indicated.

To turn SCR1 OFF, I provide a pulse-generating circuit to apply a back-biasing positive pulse at control point A between the the transformers T1 and T2. Thus, I provide a second SCR indicated as SCR2 and a capacitor C1, the SCR2 having its anode connected by line 70 to the positive side of a DC source SCR2 to indicated at $E_B$ and connected by a line 72 to ground indicated. The cathode of SCR2 is connected through lines 74, 76, and 78 through a resistor $R_1$ to the negative side of source $E_B$ and through lines 74, 80, capacitor C1 and a line 82 to control point A. A source of pulse voltage $E_{OFF}$ is connected by line 84 to the gate 86 of SCR2 to apply a trigger pulse to the gate 86 of SCR2 to apply a trigger pulse to the gate 86 of SCR2 to turn SCR1 off.

In operation, diodes CRl and CR2 rectify the RF output from the pickup coil and the full wave rectified DC voltage is applied across SCR1 and the series connected primaries 22 and 24 of tranformers T2 and T1. When SCR1 is open, i.e., in OFF condition, SCR2 is conducting and the capacitor C1 will charge up to the peak value of the RF voltage. When SCR1 is turned ON by application of a trigger voltage to its gate 62, the ON condition of SCR1 grounds control point A and results in a positive pulse across SCR2 which turns SCR2 off.

The two transformer secondaries 38 and 40 are connected, as described above, in such manner that the harmonic components of the full wave rectified voltage see a very low impedance to ground. The DC component sees only the forward drop the SCR1 and DC resistance of the transformer primaries. Since the current in SCR1 does not go through zero, SCR1 will not commute. This eliminates the need for a holding current or bias.

While SCR1 is conducting, the capacitor C1 will charge up to $E_B$, a DC voltage greater than the peak of the RF cycle voltage. This $E_B$ voltage can be either externally or self-generated.

To turn SCR1 OFF, a trigger voltage is applied through line 84 to the gate 86 of SCR2. Because of the manner in which the transformers T1 and T2 are connected, control point A is a high impedance point, a function of the leakage reactance of the transformer primaries connected in parallel. This is assuming that the leakage reactance impedance is greater than the impedance of one-half of the pickup coil. The value of the leakage reactance and the capacitive value of C1 are adjusted to produce a pulse of the proper amplitude and duration to back bias SCR1, forcing it to commute. This completes one cycle and SCR1 is ready to be triggered ON.

Results have shown that the voltage drop across an SCR switch operated in the manner described above is lower than with conventional SCR switching means and results in less heat loss in the switch. Therefore, less heat must be removed from the semiconductors. This is made easier by the fact that all the elements cases may be connected to ground. Being able to maintain the SCR at a lower temperature results in a more reliable switch and one which will handle more k.v.a.

The turnoff voltage supply can be self-generated. Since the value of this voltage need be only 5 to 10 percent higher than the peak of the RF voltage, it would be practical to use a potential transformer (not shown) across the pickup coil. If this voltage is rectified and stored in a large capacitor (not shown), it can be used $E_B$. This would make the switch self-contained except for the circuitry for generating the trigger pulses and the pickup coil.

It will be understood that various changes in the details, materials, and arrangements of parts and steps, which have been herein described and illustrated in order to explain the nature of the invention, may be made by those skilled in the art within the principle and scope of the invention as expressed in the appended claims.

I claim:

1. In a DC circuit using a DC load current carrying SCR switch an improved turnoff circuit means for forcing the load carrying SCR to commute to OFF condition without interrupting the supply of positive DC current to said SCR and without introducing an undesirably high impedance value in said DC load circuit comprising:

a. a pair of transformers having primary windings connected in series to the cathode side of said load current SCR and secondary windings connected in series and shorted;

b. the polarities of said windings being selected such that the inductance impedance to a voltage applied across said primaries in series is zero and the impedance presented to a voltage applied at a control point between said two primary windings is the leakage reactance of said primary windings connected in parallel;

c. positive pulse source connected to the gate of said load current SCR to condition said SCR to ON condition; and d. a pulse-producing DC bias voltage switching circuit means connected to said load circuit control point to produce a pulse of proper amplitude and duration to back bias said load current SCR, forcing it to commute to OFF condition.

2. Apparatus according to claim 1;

a. said DC bias voltage circuit means including a capacitor connecting said circuit to said load circuit control point; and b. said primary windings and said capacitor being selected such that the leakage reactance of said primary windings and the capacitive value of said capacitor may be adjusted to produce a pulse of the proper amplitude and duration to back bias said load carrying SCR to force it to commute.

3. Apparatus according to claim 1;

a. said DC bias voltage circuit means including a control current SCR, a resistor and a capacitor;

b. said control current SCR having means for connecting its anode to a source of positive voltage and its cathode through said resistor to a source of negative voltage;

c. said capacitor having one side connected to cathode of said control current SCR and its other side connected to said load circuit control point; and d. the value of said leakage reactance of said transformer primaries and the value of said capacitor being selected to produce a pulse of proper amplitude and duration to back bias said load current SCR, forcing it to commute.

4. Apparatus according to claim 3, said control current SCR having means for connecting its gate to a source of trigger pulse to commute said control current SCR to OFF condition and to allow said load current SCR to commute.

5. In a high power VLF switch circuit including an AC pickup coil, and diode means for passing a full wave rectified current through a first SCR to an intermediate tap on said coil improved means for interrupting the passage of DC load current through said first SCR without interrupting the supply of positive current to said SCR and hence without interrupting the supply of electromotive force to said pickup coil comprising:

a. a pair of transformers, the primary windings of said transformers being connected in series opposition between the cathode of said first SCR and said intermediate tap of said coil to limit the impedance to said DC current to the forward drop in said first SCR and the DC resistance in said transformer primary windings;

b. the secondary windings of said transformers being connected in series and short circuited;

c. me means for applying a pulse signal to the gate of said first SCR to condition said SCR to ON condition;

d. a holding pulse switch circuit connected to a control point in said first SCR circuit intermediate said primary windings;

e. said switch circuit including a resistor having one end for connection to a source of negative DC current;

f. a second SCR having an anode for connection to a source of positive DC current, its cathode connected to the other end of said resistor and means for connecting its gate to a source of back bias E.M.F. to interrupt the passage of current through said second SCR when desired;

g. a capacitor connected between the cathode of said second SCR and a control point intermediate said transformers primary windings;

the anodes of said SCR's being connected to ground; and i. the value of the leakage reactance of the transformer primaries and the value of said capacitance being selected to produce a pulse of proper amplitude and duration to back bias said first SCR, forcing it to commute.